J. A. REAMS.

RAZOR.

APPLICATION FILED FEB. 24, 1908.

12,882. Reissued Nov. 24, 1908.

Witnesses

Alice H. Bennett.

E. Ballard.

Inventor

Joseph A. Reams

By J. W. Smith

Attorney

THE NORRIS PETERS CO., WASHINGTON, D. C.

UNITED STATES PATENT OFFICE.

JOSEPH A. REAMS, OF WEST NORFOLK, VIRGINIA, ASSIGNOR, BY DIRECT AND MESNE ASSIGNMENTS, TO C. H. OCUMPAUGH, OF ROCHESTER, NEW YORK.

RAZOR.

No. 12,882. Specification of Reissued Letters Patent. Reissued Nov. 24, 1908.

Original No. 840,371, dated January 1, 1907, Serial No. 302,561. Application for reissue filed February 24, 1908. Serial No. 417,597.

*To all whom it may concern:*

Be it known that I, JOSEPH A. REAMS, a citizen of the United States, residing at West Norfolk, in the county of Norfolk and State of Virginia, have invented certain new and useful Improvements in Razors; and I do hereby declare the following to be a full, clear, and exact description of the invention, such as will enable others skilled in the art to which it appertains to make and use the same.

This invention relates to improvements in razors, and particularly to safety-razors.

The object of the invention is to provide a rigid blade V-shaped in cross-section, to insure rigidity of the entire razor, which makes shaving easier and prevents to a large degree cutting of the flesh.

The invention also comprehends improvements in the manner of clamping and covering the blade when assembled with the handle.

The invention also relates broadly to the construction of a V-shaped blade combined with a guard, whereby two cutting edges are provided, each always being the same distance from and holding the same relationship with reference to the guard.

Other objects and advantages will be hereinafter referred to and particularly pointed out in the claims.

Figure 1:
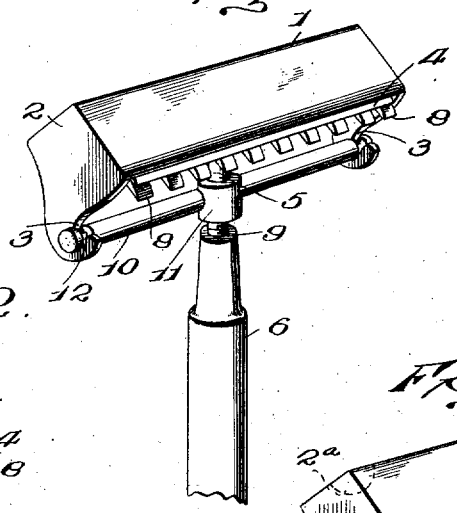
Figure 2:
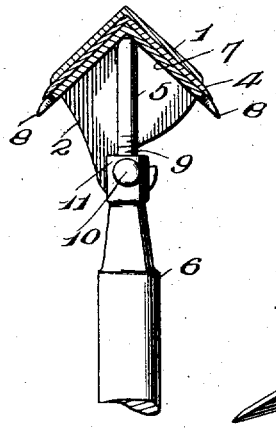
Figure 3:
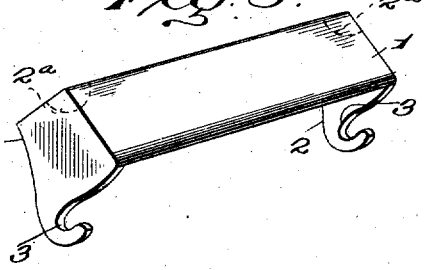
Figure 4:
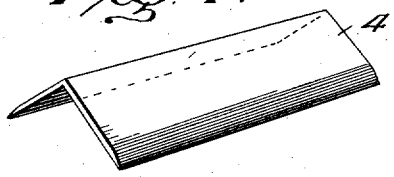
Figure 5:
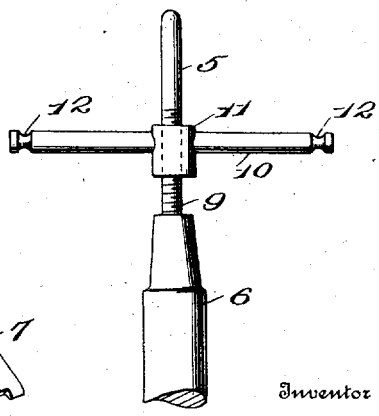
Figure 6:
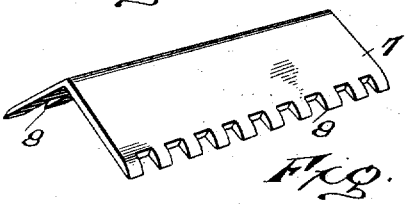
Figure 7:
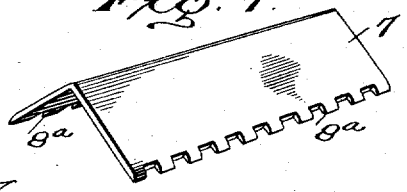

In the drawings: Figure 1 is a perspective view of a razor constructed in accordance with the present invention. Fig. 2 is a view in elevation, partly in section. Fig. 3 is a perspective view of the holder or casing. Fig. 4 is a perspective view of the blade. Fig. 5 is a fragmentary view, in side elevation, of the handle. Figs. 6 and 7 are perspective views of the guards, which are provided with toothed combs of different widths.

Referring to the drawings, 1 designates a holder, the body of which is substantially V-shaped in cross-section both internally and externally. The ends 2 are provided with sockets 3, which sockets constitute detents.

A blade 4, of thin material, bent substantially V-shaped in cross-section, is normally positioned within the angle of the holder 1 and is retained within said holder by means of an upper reduced extension 5, of the handle 6 pressing against a guard 7, which is interposed between the upper end of the extension 5 and the blade 4.

The guard 7 is also of thin material and substantially V-shaped in cross-section, and said guard is provided upon its lower longitudinal edges with teeth 8 and provides a lather-receiving receptacle within its inner angle.

The portion of the extension 5 contiguous to the handle 6 is threaded, as at 9, and upon said threaded portion of the extension 5 a bar 10 is threaded. The bar 10 is provided with a hub portion 11, having a threaded aperture. Contiguous to the ends of the bar 10, annular grooves 12—12 are formed, which grooved portions are adapted to be seated in the sockets or notches 3 of the sides 2, Fig. 1.

The blade 4, is provided with two cutting edges formed upon the lower longitudinal edges of the sides, said blade being formed of rigid material. The guard 7, is also formed of rigid material, the lower or outer ends of the teeth 8 of which extend beyond the cutting edges of the blade. The blade 4, and guard 7, are about equal to the distance between the inner faces of the ends 2, so as to hold the parts against lateral displacement as will be evident from Fig. 1.

To assemble the parts, the holder is preferably inverted, and the blade 4, is dropped in place, then the guard 7, is placed within the blade. The reduced ends of the bar 10, are now engaged in the notches 3, and the handle 6 is rotated and is fed through the threaded opening in the hub 11, until the end of the extension impinges the apex of the inner faces of the guard 7. This movement draws the holder toward the handle, and forces the blade and guard in the opposite direction and into the V-shaped seat formed by the inclined faces of said holder, and thus securely and rigidly holds the parts together. Owing to the peculiar structure of the holder, blade, and guard, the only adjustment necessary will be the seating or positioning of the bar 10 upon the recessed ends, whereby the handle may be suspended upon the casing, although normally the holder, blade, and guard are supported upon the handle.

No adjustment of the blade and guard is necessary after the upper end of the extension 5 of the handle 6 is pressed against the same. It will be noted also, that by reason of the shape of the parts, they may be assembled quickly and with little or no experience, as the seat formed in the holder is of the same shape as that of the blade and guard, and even if the latter should not be exactly in position, when the handle is turned they will be jammed into proper relationship. Obviously, guards having teeth of different lengths may be employed for beards of different natures. That is to say, a guard having short teeth, indicated at 8[a], in Fig. 1, may be used, for shaving close. For a coarse shave a guard having long teeth as shown in Fig. 6, would be substituted.

Owing to the peculiar construction of the holder, if it is desired, guards of different sizes may be readily clamped within said holder against the blade by the same clamping means.

The V-shaped structure of the holder, blade, and guard, forms a receptacle for holding the lather. The lather is forced into this receptacle formed by the casing 1 as the razor passes over the face, and may be easily removed which is a very desirable convenience.

The parts of a complete razor can be easily disassembled, as hereinbefore stated, and packed in a smaller case than is usually used for safety-razors.

For facilitating the cleaning of the holder the same may be cut away, as indicated by dotted lines 2[a], Fig. 3.

What I claim is:

1. In a razor, the combination with a holder, of a blade substantially V-shaped in cross-section, a handle for said holder, and means for clamping said blade to said holder.

2. In a razor, the combination with a holder, of a blade substantially V-shaped in cross-section, a handle, and locking means actuated by said handle and engaging said blade and arranged to secure the same within said holder.

3. In a razor, the combination of a holder, substantially V-shaped in cross-section, a blade, a guard, and means for locking said blade and guard within said holder.

4. In a razor, the combination with a holder, of a substantially V-shaped blade, a substantially V-shaped guard engaging said blade, and means for clamping said blade and guard to said holder.

5. In a razor, the combination with a holder, a blade engaging said holder, a guard engaging said blade, of a bar pivoted upon said holder, a handle revolubly mounted upon said bar and arranged to press against said blade and guard for securing them in a clamped condition against said holder.

6. In a razor, the combination with a holder, a blade and a guard positioned within said holder, of a bar pivoted upon said holder, and revoluble locking means positioned upon said bar and pressing against said guard for clamping said blade against said holder.

7. In a razor, the combination with a holder, provided with ends, of a removable supporting means connecting said ends, a revoluble member carried by said supporting means, a blade interposed between said revoluble member and said holder, and guard means interposed between said blade and said revoluble member.

8. In a razor, the combination with a holder having reversely-inclined sides, of a blade and a guard carried by and conforming in shape to said holder, and revoluble locking means for securing said blade and guard upon said holder.

9. In a razor, the combination with a holder having reversely-inclined sides, of a blade and a guard positioned within and conforming in shape to said holder, and clamping means engaging only the lower surface of said guard for clamping said guard and blade within said holder.

10. In a razor, the combination of a holder comprising an inverted, substantially V-shaped body, said body provided with sides, said sides provided with notches or sockets, a substantially V-shaped blade positioned within said holder, a substantially V-shaped guard provided with teeth upon its lower longitudinal edges, positioned within said holder and engaging said blade, a bar provided with grooves near its ends, the grooved portions of said bar engaging the notches of said sides, said bar provided with an internally-threaded hub, a handle provided with an extension, and said extension threaded near its lower end, the extension positioned within the threaded portion of said hub and having its upper end normally pressing against said guard for clamping the blade and guard against said casing.

11. In a razor, the combination of a holder provided with notched sides, horizontally-connecting means positioned within the notched portions of said sides, a handle supported upon said connecting means, and a blade positioned between said handle and the holder, and being clamped against said holder by said handle.

12. In a razor, the combination with a holder, of a bar journaled in and connecting the ends of said holder, a handle revolubly mounted upon said bar, and a blade interposed between the upper end of said handle and engaging said holder.

13. In a razor, the combination with a holder, a bar removably journaled upon said holder, a blade, and a guard positioned between said holder and bar, and revoluble locking means carried by said bar and engaging said guard for clamping said blade against said holder.

14. In a razor, the combination with a holder, of a blade, and a guard positioned within said holder, a bar journaled in and connecting the ends of said holder, and fastening means carried by said bar intermediate its ends for securing said guard and blade within said holder.

15. In a razor, the combination of a holder, blade, and guard, all substantially the same permanently approximately V-shaped, and means securing the holder, blade, and guard together.

16. In a razor, the combination of a holder, a blade having sides meeting at an angle and having two angularly disposed cutting edges, and a guard, the holder, blade, and guard being permanently substantially V-shaped and nested and held together.

17. In a razor, the combination of a holder, blade and guard each substantially V-shape and fitting within the other to position them, and means fastening the nested holder, blade, and guard together.

18. In a razor, the combination of a blade having two cutting edges, and a guard, said blade and guard being nested within the other and both substantially V-shape, and means securing the guard and blade together.

19. As a new article of manufacture a detachable razor blade made of sheet steel of uniform thickness and having two longitudinal cutting edges the blade having a permanent angular formation.

20. As a new article of manufacture a detachable razor blade made of sheet steel of uniform thickness of V-form and having two longitudinal cutting edges the blade longitudinally forming two separate planes at an angle to one another.

21. As a new article of manufacture, a detachable razor blade formed of steel with the sides in two intersecting planes united at their meeting edges to permanently retain such form, each side having a longitudinal cutting edge, the edges and the line of intersection being parallel.

22. As a new article of manufacture a razor blade having a cross section of substantially hollow V shape and having a cutting edge extending along a longitudinal edge of the blade.

23. As a new article of manufacture a detachable razor blade having a cross section of substantially hollow V shape presenting two longitudinal edges, and having a cutting edge extending along both longitudinal edges of the blade.

24. As a new article of manufacture a detachable razor blade having an angular form in a cross section forming substantially the two edges of a triangle being open on one side.

25. As a new article of manufacture a detachable razor blade having an angular form in a cross section forming substantially the two sides of a triangle being open on one side the blade being made of steel of uniform thickness.

26. In a razor, the combination with a blade having a permanent V-shaped cross section, having two cutting edges of a holding device of V-form, both of said elements being rigid.

27. In a razor the combination with a V shaped blade, of a holding device therefor, embodying an element of a V shaped blade holder and means for detachably securing the blade to the holder both the blade and said element being of rigid fixed form.

28. In a razor, the combination with a blade having two longitudinal cutting edges, a guard, a holder, each of said elements being of hollow V-shape, a handle and means carried by the handle and extending in the longitudinal direction of the blade for locking the guard to the holder.

29. In a razor, the combination with a blade having two longitudinal cutting edges, a guard, a holder, each of said elements being of hollow V-shape, a handle and means carried by the handle and extending in the longitudinal direction of the blade for locking both blade and guard to the holder.

30. In a razor, the combination of a blade having two cutting edges, a two-edged guard coöperating therewith, a holder, each of said elements being V-shape and means for locking the blade and guard to the holder, said means embodying a handle and means carried thereby for engagement with the ends of the holder.

31. In a razor the combination of a V-shaped holder with end portions, a blade having two cutting edges, a two edged guard coöperating therewith, and means adjustable lengthwise of and extending at right angles to the length of the handle for locking the blade and guard to the end portions of the holder both the blade and the guard being rigid and permanent in form.

32. In a razor the combination with a rigid blade of substantially V-shape having two cutting edges, a two edged substantially V-shape guard coöperating therewith, a holder, means for locking the blade and guard to the holder and a handle located so as to aline midway between the edges of the guard both the blade and guard being of permanent rigid form unvaried when in use.

33. In a razor a double cutting edge blade, a holder, a guard having opposite longitudinal edges to coöperate with the blade, said blade, holder and guard being of permanent hollow V-shape means for maintaining a blade in proper relation to the guard and holder said means embodying a handle secured to said holder and means carried by the handle engaging the holder at its ends.

34. As a new article of manufacture a two faced rigid detachable V-shaped guard for safety razors with its free edges serving as a guard, its sides being rigidly connected at the angle.

35. As a new article of manufacture a two faced detachable angular guard having a V shape cross section with its free edges serving as the guards and its sides rigidly connected at the angle.

36. In a razor a permanently hollow V-shaped blade holder and a longitudinal moving clamping or locking device engaging the ends of the holder and extending under the surface of the holder but parallel thereto.

37. As a new article of manufacture a rigid steel razor blade made of sheet metal of uniform thickness, the blade having an angle extending longitudinally thereof with its sides fixed in relation to each other to form a substantially V-shaped blade of fixed contour.

38. As a new article of manufacture a razor blade having two longitudinal cutting edges and two sides joined at and divided by an angle, the two cutting edges being equally distant from the angle.

39. As a new article of manufacture a razor blade having a V shaped cross section having two longitudinal cutting edges and two sides divided by an angle, the two cutting edges being equally distant from the angle and parallel therewith.

40. In a razor the combination of a blade having two longitudinal cutting edges, a guard, a handle and a holder detachable therefrom the holder having separate surfaces coöperating with the upper surface of said blade and acting as its support and means adjustable on the handle and coöperating with the side of the holder.

41. As a new article of manufacture a detachable rigid razor blade made of sheet metal of uniform thickness the blade being bent longitudinally so as to form two cutting edges the sides of the blade being disposed at an angle to one another.

42. As a new article of manufacture a rigid angular razor blade made of sheet metal of uniform thickness having two cutting edges the sides of the blade being so disposed that the angle between the two edges is greater than an acute angle.

43. In a razor the combination of a rigid angular two edged blade, a guard therefor, and a holder for the blade of substantially V-shape extending longitudinally beyond the ends of the blade and having a cut away portion at its ends.

44. In a razor the combination of a rigid, angular two edged blade, a guard therefor, and a holder for both blade of substantially V-shape and guard extending longitudinally beyond the ends of the blade and having a cut away portion at its ends at the angle.

45. In a razor, a holder of substantially V-shape having end portions, a similarly shaped blade confined between said end portions, and means for holding the blade within the holder.

46. In a razor, a holder of substantially V-shape having end portions, a similarly shaped blade, a similarly shaped guard, and means retaining said members within the ends of the holder.

47. In a razor, a substantially V-shaped holder having ends with sockets, a substantially V-shaped blade, a similarly shaped guard, a handle having one end engaging the guard near its apex, and means on the handle engaging the sockets of said ends.

48. In a razor, a substantially V-shaped holder with ends provided with sockets, a similarly-shaped blade, a similarly-shaped guard, all nested together, a handle having one end engaging the under side of the guard at the apex thereof, and means on the handle extending parallel with the length of the holder and having its ends engaged in said sockets.

In testimony whereof I affix my signature in presence of two witnesses.

J. A. REAMS.

Witnesses:

HENRY MCGRANIGHAN,

GEO. E. GARY.